US007219258B2

(12) United States Patent
LeVangia et al.

(10) Patent No.: US 7,219,258 B2
(45) Date of Patent: May 15, 2007

(54) METHOD, SYSTEM, AND PRODUCT FOR UTILIZING A POWER SUBSYSTEM TO DIAGNOSE AND RECOVER FROM ERRORS

(75) Inventors: Peter Joseph LeVangia, Kingston, NY (US); Louis Gabriel Rodriguez, Austin, TX (US); Steven Vongvibool, Austin, TX (US); Peter Adam Wendling, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/733,949

(22) Filed: Dec. 11, 2003

(65) Prior Publication Data

US 2005/0144533 A1    Jun. 30, 2005

(51) Int. Cl.
    *G06F 11/00* (2006.01)
(52) U.S. Cl. .......................................... 714/14; 714/44
(58) Field of Classification Search .................. 714/14, 714/44, 3
    See application file for complete search history.

(56) References Cited

U.S. PATENT DOCUMENTS

| | | | | |
|---|---|---|---|---|
| 5,590,354 | A | 12/1996 | Klapproth et al. | 395/800 |
| 5,631,912 | A | 5/1997 | Mote, Jr. | 371/22.3 |
| 5,852,617 | A | 12/1998 | Mote, Jr. | 371/22.31 |
| 5,862,152 | A | 1/1999 | Handly et al. | 371/22.32 |
| 6,282,674 | B1 | 8/2001 | Patel et al. | 714/30 |
| 6,347,368 | B1 | 2/2002 | Harthcock | 712/227 |
| 6,427,216 | B1 | 7/2002 | El-Kik et al. | 714/726 |
| 6,546,507 | B1 | 4/2003 | Coyle et al. | 714/43 |
| 6,718,482 | B2 * | 4/2004 | Sato et al. | 714/4 |
| 7,032,130 | B2 * | 4/2006 | Yamamoto et al. | 714/13 |
| 7,080,285 | B2 * | 7/2006 | Kosugi et al. | 714/36 |
| 2003/0023771 | A1 | 1/2003 | Erickson et al. | 709/327 |
| 2003/0061020 | A1 | 3/2003 | Michael | 703/28 |
| 2003/0126533 | A1 | 7/2003 | McAdams | 714/727 |
| 2003/0163773 | A1 | 8/2003 | O'Brien et al. | 714/726 |

OTHER PUBLICATIONS

IBM Technical Disclosure Bulletin, "SRL Modification to Provide Sample Function in Singl -Latch Design", vol. 32, No. 4A, Sep. 1989, pp. 255-258.
IBM Research Disclosure 41785, "Method to Increase Accessibility of Low-Level Computer State Information", Jan. 1999, pp. 126-127.
Pizzica, "Open Systems Architecture Solutions for Military Avionics Testing", Aerospace and Electronic Systems Magazine, IEEE, vol. 16, No. 8, Aug. 2001, 2 pages.

* cited by examiner

*Primary Examiner*—Marc Duncan
(74) *Attorney, Agent, or Firm*—Duke W. Yee; Diana R. Gerhardt; Lisa L. B. Yociss

(57) ABSTRACT

A method, system, and computer program product are disclosed for diagnosing and recovering from I/O subsystem errors. A data processing system includes a computer which includes a power subsystem and at least one I/O subsystem. A determination is made that an error occurred in the I/O subsystem. Registers in integrated circuits included within the I/O subsystem are accessed utilizing the power subsystem in order to diagnose the error while the I/O subsystem is in an error state.

21 Claims, 3 Drawing Sheets

METHOD, SYSTEM, AND PRODUCT FOR UTILIZING A POWER SUBSYSTEM TO DIAGNOSE AND RECOVER FROM ERRORS

BACKGROUND OF THE INVENTION

1. Technical Field

The present invention relates generally to an improved data processing system, and in particular to a method, system, and product for diagnosing and recovering from errors utilizing a data processing system's power subsystem. Still more particularly, the present invention relates to diagnosing and recovering from I/O subsystem errors utilizing a data processing system's power subsystem.

2. Description of Related Art

Many different types of errors may occur in a computer system. Some of these errors are difficult to diagnose and repair because the information that is stored in the computer system that would help in the diagnosis, such as the contents of certain registers, is inaccessible as a result of the error.

Input/output (I/O) adapter errors in particular may be difficult to diagnose without specialized debug software and may be difficult to recreate remotely at the manufacturer's site. I/O errors are difficult to diagnose due to the layout of the planars. There can be over ten PCI devices and it is nearly impossible to isolate a problem down to one adapter. In many cases, once one PCI device causes an error, it will cause several side effect errors from other PCI devices.

Currently, major bugs at a customer's site are difficult to debug. One current approach is to execute an operating system dump and hope to find and debug the problem back at the manufacturer's site.

In order to correctly diagnose an I/O error, the extended register information of the I/O chips is necessary. We must be able to gather the extended register information to diagnose the state of each device at the time of failure.

Therefore, a need exists for a method, system, and product for diagnosing and recovering from I/O subsystem errors utilizing a data processing system's power subsystem.

SUMMARY OF THE INVENTION

A method, system, and computer program product are disclosed for diagnosing and recovering from I/O subsystem errors utilizing a computer system's power subsystem. The data processing system includes the computer system and a hardware management computer system. The computer system's power subsystem includes a JTAG engine within the power supply of the power subsystem. The JTAG engine is coupled to multiple different integrated circuits in the I/O subsystem via a JTAG/I2C bus. A command is received within the JTAG engine from a hardware management computer system that is external to the computer system. The command specifies an operation to be performed utilizing a specified one of the integrated circuits. The JTAG engine executes the command which performs the specified operation utilizing the specified integrated circuit. Results of the operation are then returned from the power supply to the hardware management computer system for analysis. Errors may be diagnosed and corrected utilizing the results of the operation.

The present invention may be used to obtain extended register information once an I/O error has occurred in order to diagnose the state of each device at the time of failure.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

A method, system, and computer program product are disclosed for diagnosing and recovering from I/O subsystem errors utilizing a computer's power subsystem. A computer is coupled to a hardware management computer system which is separate from the computer. The computer's power subsystem includes a power supply controller that is coupled to one or more power supplies, where one power supply is located in each I/O drawer. Each power supply includes a processor and a JTAG engine. The JTAG engine is coupled to integrated circuits that are part of the I/O subsystem. For example, the JTAG engine is coupled to each EADS chip and each PCI—PCI bridge in the I/O drawer using a JTAG/I2C bus.

When an error occurs in the I/O drawer, the JTAG engine can access the registers within any of the EADS or PCI—PCI bridge chips using the JTAG/I2C bus. When an error occurs, the hardware management computer transmits a command to the power supply controller which forwards the command to the power supply in the I/O drawer that is specified by the command.

The JTAG engine in the I/O drawer then determines which particular chip is specified by the command by determining a ring number. Each chip in the drawer is associated with a unique JTAG ring number. The power supply's JTAG engine uses the ring number to determine which chip is to be accessed. The JTAG engine then either reads the contents of that chip's registers or writes data into the register.

Results of the execution of the command are returned from the power supply to the power supply controller which then forwards the results back to the hardware management computer. The hardware management computer then evaluates the results to diagnose and recover the I/O drawer from the error.

Figure 1:
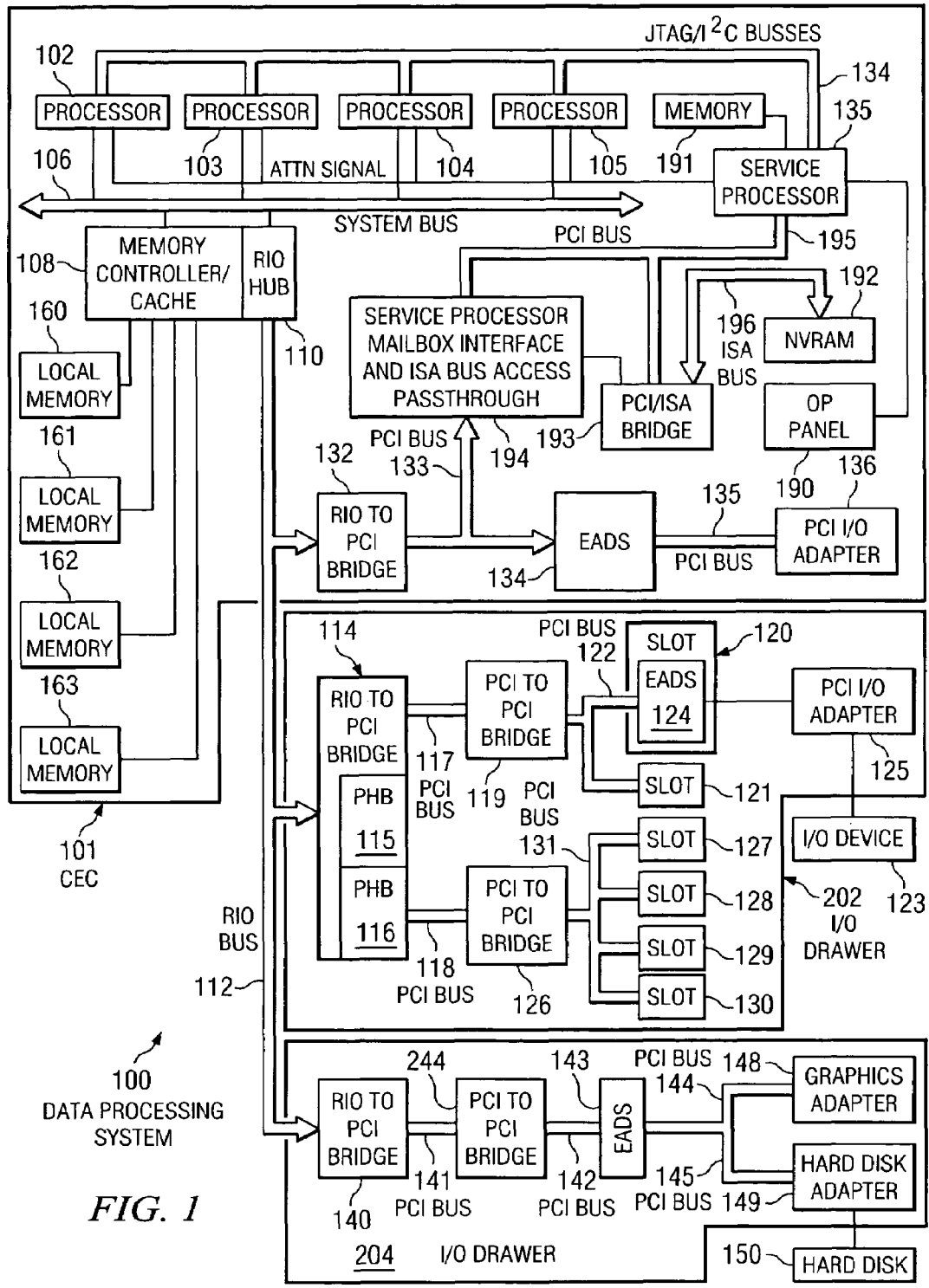
FIG. 1 is a block diagram of a data processing system in which the present invention may be implemented in accordance with the present invention.

FIG. 1 depicts a block diagram of a data processing system in which the present invention may be implemented in accordance with the present invention. Data processing system 100 may be a symmetric multiprocessor (SMP) system including a plurality of processors 102, 103, 104, and 105 connected to system bus 106. For example, data processing system 100 may be an IBM RS/6000, a product of International Business Machines Corporation in Armonk, N.Y. Data processing system 100 includes a central electronic complex 101 which includes logically partitioned hardware. CEC 101 includes a plurality of processors 102, 103, 104, and 105 connected to system bus 106. Alternatively, a single processor system may be employed. Also connected to system bus 106 is memory controller/cache 108, which provides an interface to a plurality of local memories 160–163. RIO Hub 110 is connected to system bus 106 and provides an interface RIO bus 112. Memory controller/cache 108 and RIO Hub 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI slots, to which PCI I/O adapters may be coupled, such as slots 120, 121, and 127–130, graphics adapter 148, and hard disk adapter 149, which may each be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of slots 120, 121, and 127–130, graphics adapter 148, hard disk adapter 149, each of host processors 102–105, and each of local memories 160–163 is assigned to one of the three partitions.

Two I/O drawers 202 and 204 are depicted. Those skilled in the art will recognize that data processing system 100 may include any number of I/O drawers.

I/O drawer 202 includes RIO to PCI bridge 114 and the devices coupled RIO to PCI bridge 114 as described below. I/O drawer 204 includes RIO to PCI bridge 140 and the devices coupled RIO to PCI bridge 140 as described below.

RIO to PCI bridge 114 is connected RIO bus 112 and provides an interface to PCI bus 117 and PCI bus 118. RIO to PCI bridge 114 includes one or more PCI host bridges (PHB), such as PHB 115 and PHB 116. Each PHB is coupled to a PCI to PCI bridge through a PCI bus. For example, PHB 115 is coupled to PCI to PCI bridge 119 through PCI bus 117. PHB 116 is coupled to PCI to PCI bridge 126 through PCI bus 118. Each PCI to PCI bridge is coupled to one or more PCI slots. For example, PCI to PCI bridge 119 is coupled to slot 120 and slot 121 using PCI bus 122. Although only two slots are shown, typically either four or eight slots are supported by each PHB. PCI to PCI bridge 126 is coupled to slots 127–130 using PCI bus 131.

Each slot includes an EADS chip to which a PCI I/O adapter may be attached. For example, slot 120 includes EADS 124. An I/O adapter may be inserted into a slot and thus coupled to an EADS. For example, I/O adapter 125 is inserted into slot 120 and coupled to EADS 124. An I/O device may be coupled to data processing system 100 utilizing an I/O adapter. For example, as depicted, I/O device 123 is coupled to I/O adapter 125.

A memory mapped graphics adapter 148 may be connected RIO bus 112 through PCI bus 144, EADS 143, PCI bus 142, PCI to PCI bridge 244, PCI to PCI bus 141, and RIO to PCI bridge 140. A hard disk 150 may be coupled to hard disk adapter 149 which is connected to PCI bus 145. In turn, this bus is connected to EADS 143, which is connected RIO to PCI Bridge 140 by PCI bus 142, PCI to PCI bridge 244, and PCI bus 141.

An RIO to PCI bridge 132 provides an interface for a PCI bus 133 to connect RIO bus 112. PCI I/O adapter 136 is connected to EADS 134 by PCI bus 135. EADS 134 is connected to PCI bus 133. This PCI bus also connects RIO to PCI bridge 132 to the service processor mailbox interface and ISA bus access pass-through logic 194. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 102–105 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 102, 103, 104, and 105 are connected together to an interrupt input signal of the service processor. The service processor 135 has its own local memory 191, and has access to the hardware OP-panel 190.

When data processing system 100 is initially powered up, service processor 135 uses the JTAG/scan I²C busses 134 to interrogate the system (host) processors 102–105, memory controller/cache 108, and RIO Hub 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 102–105, memory controller/cache 108, and RIO Hub 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 102–105 for execution of the code loaded into host memory 160–163. While the host processors 102–105 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 102–105, local memories 160–163, and RIO Hub 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
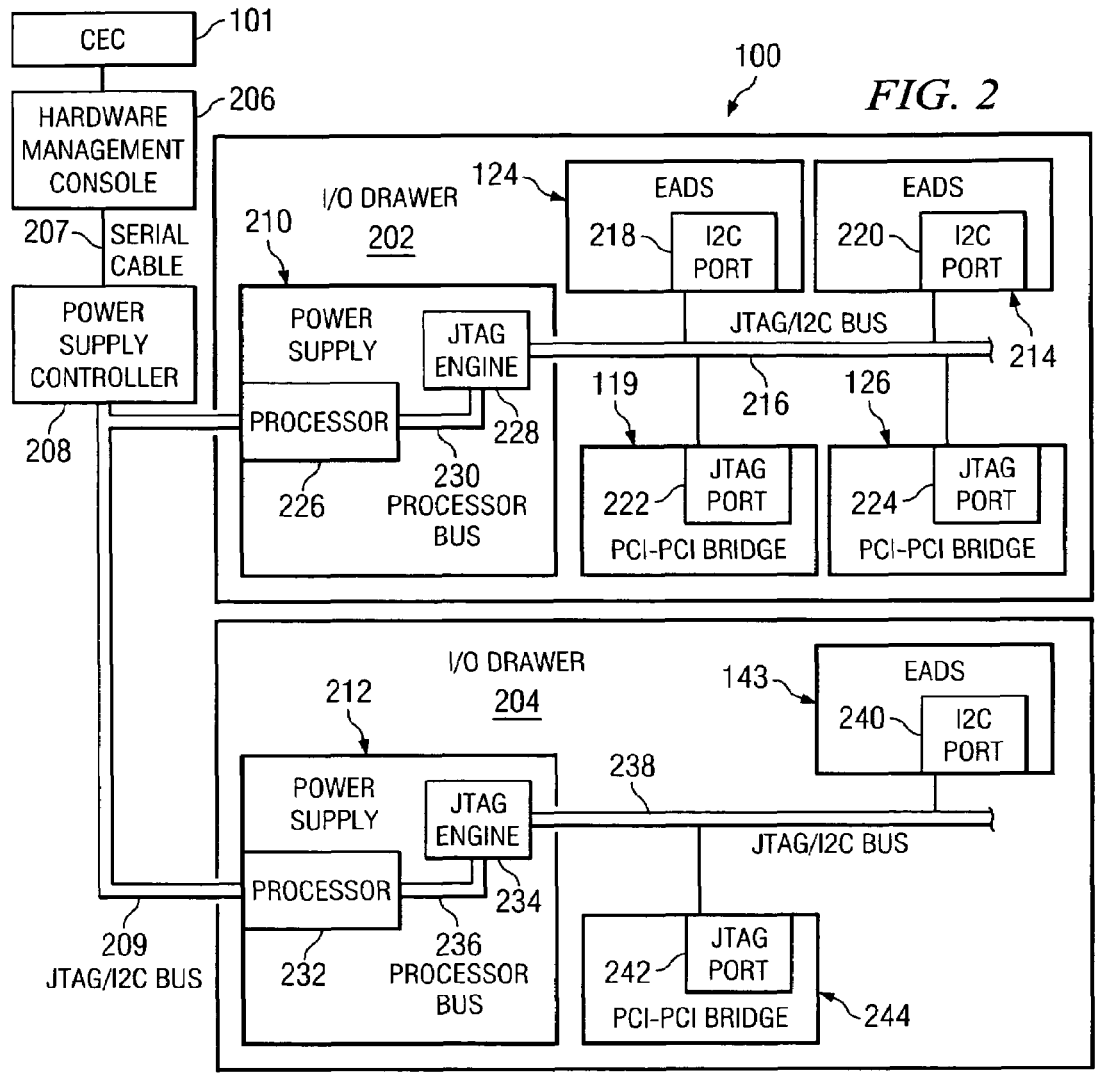
FIG. 2 is a more detailed block diagram of the I/O subsystem and power subsystem of FIG. 1 in accordance with the present invention.

FIG. 2 is a more detailed block diagram of the I/O subsystem and power subsystem of FIG. 1 in accordance with the present invention. Data processing system 100 includes a hardware management console (HMC) 206 that is coupled to CEC 101. HMC 206 is a separate computer system that is used to manage CEC 101 and the other components, such as I/O drawers 202 and 204, of data processing system 100. Data processing system 100 includes a power supply subsystem that includes a power supply controller 208 and one or more power supplies, such as power supplies 210 and 212. Data processing system 100 also includes one or more I/O subsystems which each include one or more I/O drawers, such as I/O drawers 202 and 204.

HMC 206 is coupled to a power supply controller 208 via a serial cable 207. Power supply controller 208 is coupled to one or more I/O drawers utilizing JTAG/I2C bus 209.

I/O drawer 202 includes power supply 210 that is coupled to EADS 124, EADS 214, PCI—PCI bridge 119, and PCI—PCI bridge 126 via a JTAG/I2C bus 216. EADS 124 includes an I2C port 218 for coupling EADS 124 to JTAG/I2C bus 216. EADS 214 includes an I2C port 220 for coupling EADS 214 to JTAG/I2C bus 216. PCI—PCI bridge 119 includes a JTAG port 222 for coupling PCI—PCI bridge 119 to JTAG/I2C bus 216. And, PCI—PCI bridge 126 includes a JTAG port 224 for coupling PCI—PCI bridge 126 to JTAG/I2C bus 216.

Power supply 210 receives and transmits commands via JTAG/I2C bus 209 utilizing a processor 226. Power supply 210 also includes a JTAG engine 228 for receiving commands from processor 226 via processor bus 230. JTAG engine 228 then processes commands in accordance with the JTAG standard to select an integrated circuit, i.e. chip, such as an I/O chip according to the ring select included in the command, and to perform the operation specified in the command. The registers within the selected chip may be read from or written to. Therefore, extended register information may be obtained from a chip by reading the registers of one or more selected chips in order to diagnose the state of each device at the time of failure.

For example, EADS 124 might be associated with ring select 0, while EADS 214 is associated with ring select 2, PCI—PCI bridge 119 is associated with ring select 3, and PCI—PCI bridge 126 is associated with ring select 4. In this manner, commands may be properly routed by JTAG engine 228 to the specified chip.

Power supply 212 receives and transmits commands via JTAG/I2C bus 209 utilizing a processor 232. Power supply 212 also includes a JTAG engine 234 for receiving commands from processor 232 via processor bus 236. JTAG engine 234 then processes commands in accordance with the JTAG standard to select a chip according to the ring select included in the command, and to perform the operation specified in the command.

Power supply 212 is coupled to EADS 143 and PCI—PCI bridge 244 via a JTAG/I2C bus 238. EADS 143 includes an I2C port 240 for coupling EADS 143 to JTAG/I2C bus 238. PCI—PCI bridge 244 includes a JTAG port 242 for coupling PCI—PCI bridge 244 to JTAG/I2C bus 238.

Figure 3A:
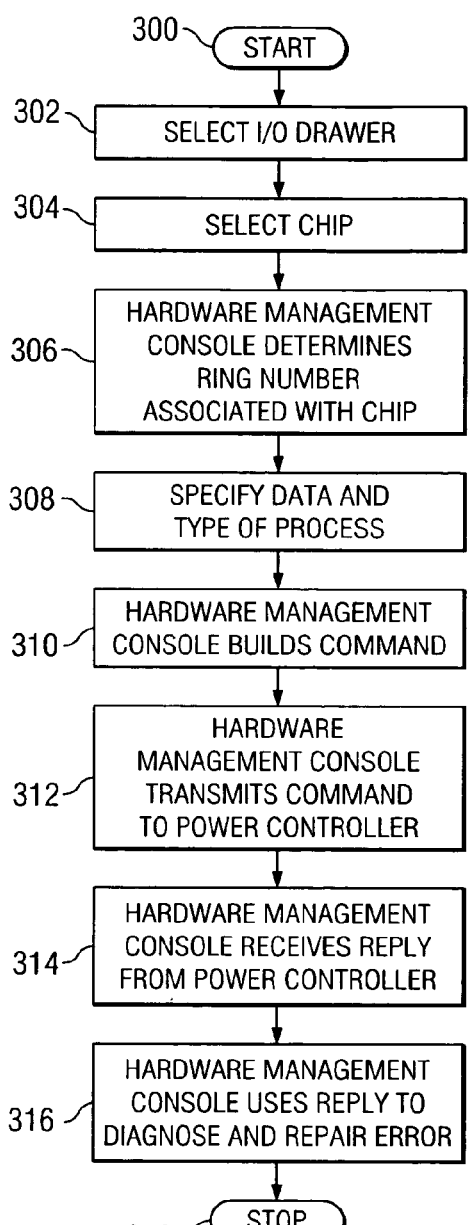
FIG. 3a depicts a high level flow chart which illustrates a hardware management console transmitting to a power subsystem a command to diagnose and recover from errors using the power subsystem in accordance with the present invention.
Figure 3B:
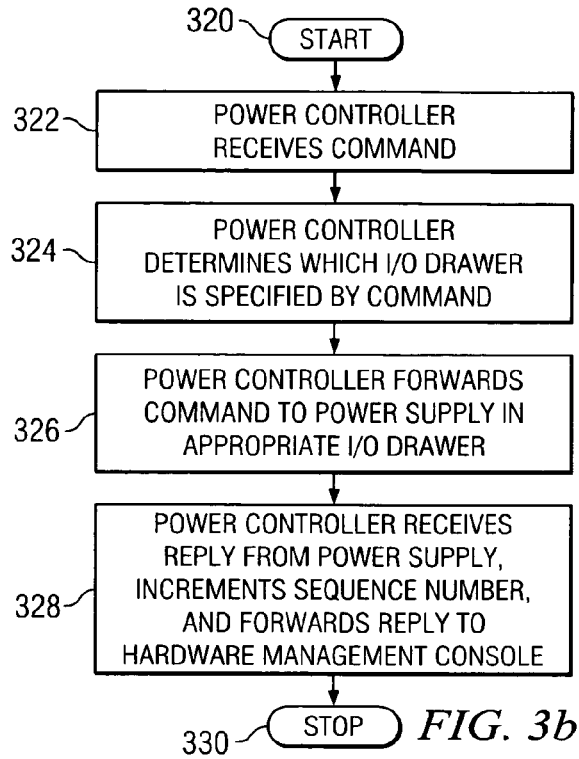
FIG. 3b illustrates a high level flow chart which depicts a power controller included within a power subsystem processing a command to diagnose and recover from errors in accordance with the present invention.
Figure 3C:
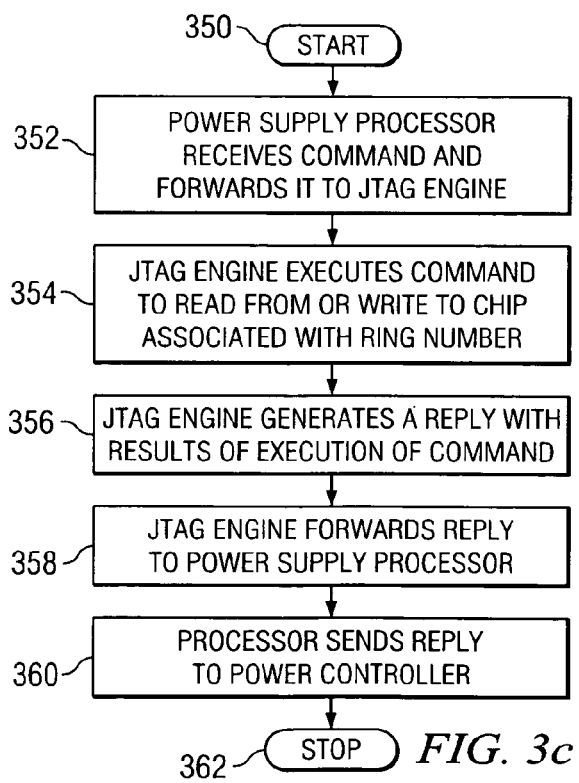
FIG. 3c depicts a high level flow chart which illustrates a power supply included within a power subsystem executing a command to read from or write to an integrated circuit in an I/O subsystem in accordance with the present invention.

The processes described herein and with reference to FIGS. 3a–3c may be executed regardless of whether or not an error has occurred in any of the I/O drawers. Thus, if an error has occurred in an adapter, the EADS chip and/or the PCI/PCI bridge to which the adapter is connected may be read from or written to. The contents of registers within one or both of these chips may be read regardless of whether or not an error condition has occurred. The contents of the chips to which other adapters are connected may also be accessed regardless of whether an error has occurred in the I/O drawer.

FIG. 3a depicts a high level flow chart which illustrates a hardware management console transmitting to a power subsystem a command to diagnose and recover from errors using the power subsystem in accordance with the present invention. The process starts as depicted by block 300 and thereafter passes to block 302 which illustrates selecting an I/O drawer to evaluate. Next, block 304 depicts selecting one of the integrated circuits, i.e. chips, in the selected I/O drawer. Next, block 306 illustrates the HMC determining a ring number associated with the selected chip. Each chip is associated with a particular ring number that will be used by the JTAG engine to select the chip.

The process then passes to block 308 which depicts specifying data and the type of process, such as a read or write operation, to execute utilizing the chip. Thereafter, block 310, depicts the HMC building a command. The command will include the information illustrated by FIG. 4, including a command major and minor which indicate the type of process, a ring select used to identify which chip is to be utilized, data, and other information, as well as an identification of a particular I/O drawer. Block 312, then, illustrates the HMC transmitting the command to the data processing system's power controller. Next, block 314 depicts the HMC receiving a reply from the power controller. Next, block 316 illustrates the HMC using the reply to diagnose and repair errors. The process then terminates as depicted by block 318.

FIG. 3b illustrates a high level flow chart which depicts a power controller included within a power subsystem processing a command to diagnose and recover from errors in accordance with the present invention. The process starts as depicted by block 320 and thereafter passes to block 322 which illustrates the power controller receiving a command from the HMC. Next, block 324 depicts the power controller determining which I/O drawer is specified by the command.

The process then passes to block 326 which illustrates the power controller forwarding the command to the power supply in the selected I/O drawer. Block 328, then, depicts the power controller receiving a reply from the power supply, incrementing the sequence number, and forwarding the reply to the HMC. The process then terminates as illustrated by block 330.

FIG. 3*c* depicts a high level flow chart which illustrates a power supply included within a power subsystem executing a command to read from or write to an integrated circuit in an I/O subsystem in accordance with the present invention. The process starts as depicted by block 350 and thereafter passes to block 352 which illustrates the power supply's processor receiving a command and forwarding it to the power supply's JTAG engine. Next, block 354 depicts the JTAG engine executing the command to either read from or write to the chip associated with the ring number included in the command. Block 356, then, illustrates the JTAG engine generating a reply with the results of the execution of the command. Thereafter, block 358 depicts the JTAG engine forwarding the reply to the power supply's processor. Block 360, then, illustrates the processor sending the reply to the power controller. The process then terminates as depicted by block 362.

Figure 4:
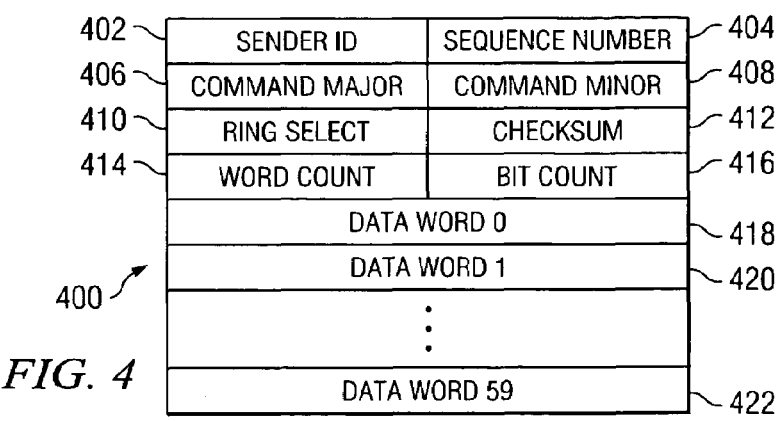
FIG. 4 illustrates a block diagram of a packet definition for a command that is utilized by a data processing system's power subsystem to diagnose and recover from I/O subsystem errors in accordance with the present invention.

FIG. 4 illustrates a block diagram of a packet definition 400 for a command that is utilized by a data processing system's power subsystem to diagnose and recover from I/O subsystem errors in accordance with the present invention. Packet definition 400 includes a sender identifier 402 that identifies the sender. Some data processing systems include multiple different HMCs. In these systems, the particular HMC that sent the command is identified by sender identifier 402. A sequence number 404 is also included which is the sequence number for the packet. The sequence number 402 permits command retries when packets are lost or corrupted during transmission. The power controller will process a packet having each sequence number once.

The operation to be performed by the JTAG engine is described using a command major 406 and a command minor 408. For example, a command major 406 might specify either an access of an EADS chip via its I2C port or an access of a PCI—PCI bridge via its JTAG bus. A command minor 408 would specify either a read or write operation.

Ring select 410 indicates which chip is to be accessed. For example, each chip is associated with a different ring number. This number is used as the ring select 410 to identify the chip.

Checksum 412 is a ones complement of the sum of the data words. Word count 414 indicates the number of data words in the packet. Bit count 416 indicates the number of bits used in the last data word. Checksum 412, word count 414, and bit count 416 are used to verify whether the transmission of the packet was completed accurately.

Data word 0 418, data word 1 420, through data word 59 422 include the data to be written for write operations. When the command is a reply from the power subsystem to the HMC, data word 0 418, data word 1 420, through data word 59 422 include the data read from a chip's registers after a read operation was executed.

The following are examples of the process of the present invention.

To read from or write to an EADS integrated circuit, the following values are utilized in a packet:

| | |
|---|---|
| Sender Identifier = | appropriate number |
| Sequence number = | next number in sequence |
| Command Major = | 0x20 (Indicating EADS I2C access) |
| Command Minor = | 0x00 (to Read from chip) |
| | 0x01 (to Write to chip) |
| Ring Select = | 0x01 (EADS 1 on Board 1) |
| | 0x02 (EADS 2 on Board 1) |
| | 0x03 (EADS 3 on Board 1) |
| | 0x81 (EADS 1 on Board 2) |
| | 0x82 (EADS 2 on Board 2) |
| | 0x83 (EADS 3 on Board 2) |
| Checksum = | not used |
| Word count = | 0x03 |
| Bit count = | 0x00 |

For a READ operation:
These values are sent from the HMC to the power controller:

| | |
|---|---|
| Data word 0 = | Selected I2C register to read |
| Data word 1 = | 0x0000 |
| Data word 2 = | 0x0000 |

These values are returned to the HMC from the power controller:

| | |
|---|---|
| Data word 0 = | contents of upper 16 bits of selected register to read |
| Data word 1 = | contents of lower 16 bits of selected register to read |

For a WRITE operation:
These values are sent from the HMC to the power controller:

| | |
|---|---|
| Data word 0 = | selected register to write to |
| Data word 1 = | upper 16 bits to write to selected register |
| Data word 1 = | lower 16 bits to write to selected register |

The header that was sent to the power controller is copied into the response from the power controller, and the sequence number is incremented.

To read from or write to a PCI—PCI bridge integrated circuit, the following values are utilized in a packet:

| | |
|---|---|
| Sender Identifier = | appropriate number |
| Sequence number = | next number in sequence |
| Command Major = | 0x40 (Indicating PCI-PCI JTAG access) |
| Command Minor = | 0x00 (to Read from chip) |
| | 0x80 (to Write to chip) |
| Ring Select = | 0x00 (PCI-PCI on Board 1) |
| | 0x80 (PCI-PCI on Board 2) |
| Checksum = | not used |
| Word count = | 0x03 |
| Bit count = | 0x00 |

-continued

| | |
|---|---|
| Data word 0 = | Selected JTAG register |
| Data word 1 = | register value |
| Data word 2 = | register value |
| Data word 3 = | register value |
| Data word 4 = | register value |

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for diagnosing errors, said data processing system including a computer which includes a power subsystem and at least one I/O subsystem, said method comprising the steps of:
   determining that an error occurred in said at least one I/O subsystem;
   accessing registers in integrated circuits included within said I/O subsystem utilizing said power subsystem to diagnose said error while said I/O subsystem is in an error state;
   including a power supply controller and at least one power supply in said power subsystem;
   said power supply being located in said at least one I/O subsystem; and
   including a processor and a JTAG processing engine in said at least one power supply.

2. The method according to claim 1, wherein said data processing system includes a hardware management computer system coupled to said computer, further comprising:
   coupling said hardware management computer system to a central electronics complex that is included within said computer; and
   accessing said power subsystem by said hardware management computer system.

3. The method according to claim 1, further comprising:
   including within said at least one I/O subsystem an I/O adapter coupled to a first integrated circuit and a second integrated circuit coupled to said first integrated circuit; and
   coupling said first and second integrated circuits to said processing engine.

4. The method according to claim 3, further comprising:
   coupling said first and second integrated circuits to said JTAG processing engine utilizing a JTAG/I2C bus.

5. The method according to claim 1, wherein said data processing system includes a hardware management computer system coupled to said computer, further comprising:
   coupling said hardware management computer system to a central electronics complex that is included within said computer;
   transmitting a command from said hardware management computer system to said power subsystem to access said at least one I/O subsystem.

6. The method according to claim 5, further comprising:
   receiving said command within a power supply included within said I/O subsystem;
   executing said command within said power supply; and
   in response to executing said command, accessing, by said power supply, integrated circuits included in said I/O subsystem while said I/O subsystem is in an error state.

7. The method according to claim 5, further comprising:
   including at least one power supply in said power subsystem, said power supply being located in said at least one I/O subsystem;
   including a JTAG engine in said at least one power supply;
   including within said at least one I/O subsystem an I/O adapter coupled to a first integrated circuit and a second integrated circuit coupled to said first integrated circuit;
   coupling said first and second integrated circuits to said JTAG engine utilizing a JTAG/I2C bus;
   transmitting said command from said hardware management computer system to said power supply to access said at least one I/O subsystem;
   receiving said command within said JTAG engine; and
   accessing, by said JTAG engine, either said first or second integrated circuits in response to said JTAG engine processing said command.

8. The method according to claim 7, further comprising:
   reading contents of registers included within either said first or second integrated circuits.

9. The method according to claim 7, further comprising:
   writing data to store in said registers included within either said first or second integrated circuits.

10. The method according to claim 7, further comprising:
    associating a unique JTAG ring number with said first and second integrated circuits; and
    determining either said first or second integrated circuits to be accessed utilizing a JTAG ring number associated with said first and second integrated circuits.

11. A data processing system for diagnosing errors, said data processing system including a computer which includes a power subsystem and at least one I/O subsystem, said system comprising:
    said computer including a CPU executing code for determining that an error occurred in said at least one I/O subsystem;
    said power subsystem for accessing registers in integrated circuits included within said I/O subsystem utilizing said power subsystem to diagnose said error while said I/O subsystem is in an error state;
    a power supply controller and at least one power supply included in said power subsystem;
    said power supply being located in said at least one I/O subsystem; and
    a processor and a JTAG processing engine included in said at least one power supply.

12. The system according to claim 11, wherein said data processing system includes a hardware management computer system coupled to said computer, further comprising:
   said hardware management computer system coupled to a central electronics complex that is included within said computer; and
   said hardware management computer system for accessing said power subsystem.

13. The system according to claim 11, further comprising:
   an I/O adapter included within said at least one I/O subsystem, said I/O adapter coupled to a first integrated circuit and a second integrated circuit coupled to said first integrated circuit; and
   said first and second integrated circuits coupled to said processing engine.

14. The system according to claim 13, further comprising:
   said first and second integrated circuits coupled to said JTAG processing engine utilizing a JTAG/I2C bus.

15. The system according to claim 11, wherein said data processing system includes a hardware management computer system coupled to said computer, further comprising:
   said hardware management computer system coupled to a central electronics complex that is included within said computer;
   said hardware management computer system transmitting a command to said power subsystem to access said at least one I/O subsystem.

16. The system according to claim 15, further comprising:
   said power supply included within said I/O subsystem for receiving said command;
   said power supply for executing said command; and
   in response to executing said command, said power supply for accessing integrated circuits included in said I/O subsystem while said I/O subsystem is in an error state.

17. The system according to claim 15, further comprising:
   at least one power supply included in said power subsystem, said power supply being located in said at least one I/O subsystem;
   a JTAG engine included in said at least one power supply;
   an I/O adapter included within said at least one I/O subsystem, said I/O adapter coupled to a first integrated circuit and a second integrated circuit coupled to said first integrated circuit;
   said first and second integrated circuits coupled to said JTAG engine utilizing a JTAG/I2C bus;
   said hardware management computer system for transmitting said command to said power supply to access said at least one I/O subsystem;
   said JTAG engine for receiving said command; and
   said JIAG engine for accessing either said first or second integrated circuits in response to said JTAG engine processing said command.

18. The system according to claim 17, further comprising:
   said JTAG engine for reading contents of registers included within either said first or second integrated circuits.

19. The system according to claim 18, further comprising:
   said JTAG engine for writing data to store in said registers included within either said first or second integrated circuits.

20. The system according to claim 17, further comprising:
   a unique JTAG ring number associated with said first and second integrated circuits; and
   said JTAG ring number being utilized to determine either said first or second integrated circuits to be accessed.

21. A computer program product comprising:
   a computer-readable storage medium including computer usable program code for diagnosing errors in a data processing system that includes a computer, which includes a power subsystem and at least one I/O subsystem, wherein a power supply controller and at least one power supply are included in said power subsystem, said power supply being located in said at least one I/O subsystem, and including a processor and a JTAG processing engine in said at least one power supply; said computer program product including:
   computer usable program code for determining that an error occurred in said at least one I/O subsystem; and
   computer usable program code for accessing registers in integrated circuits included within said I/O subsystem utilizing said power subsystem to diagnose said error while said I/O subsystem is in an error state.

* * * * *